US012674222B2

(12) United States Patent
Ojima et al.

(10) Patent No.: US 12,674,222 B2
(45) Date of Patent: Jul. 7, 2026

(54) MATERIAL CHARACTERISTIC VALUE PREDICTION SYSTEM AND METHOD OF MANUFACTURING METAL SHEET

(71) Applicant: JFE STEEL CORPORATION, Tokyo (JP)

(72) Inventors: Mayumi Ojima, Tokyo (JP); Yoshimasa Funakawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 654 days.

(21) Appl. No.: 18/043,579

(22) PCT Filed: Aug. 16, 2021

(86) PCT No.: PCT/JP2021/029901
§ 371 (c)(1),
(2) Date: Mar. 1, 2023

(87) PCT Pub. No.: WO2022/054500
PCT Pub. Date: Mar. 17, 2022

(65) Prior Publication Data
US 2023/0323503 A1 Oct. 12, 2023

(30) Foreign Application Priority Data

Sep. 14, 2020 (JP) ................................. 2020-154166

(51) Int. Cl.
*C21D 11/00* (2006.01)
*B21B 37/76* (2006.01)
(Continued)

(52) U.S. Cl.
CPC .............. *C21D 11/00* (2013.01); *B21B 37/76* (2013.01); *C21D 8/02* (2013.01); *C21D 8/0263* (2013.01);
(Continued)

(58) Field of Classification Search
CPC .... C21D 11/00; C21D 8/0205; C21D 8/0263; C21D 8/00278; C21D 9/46; B21B 37/76;
(Continued)

(56) References Cited

U.S. PATENT DOCUMENTS 6,546,310 B1 4/2003 Ruediger et al.
2014/0175713 A1 6/2014 Roessiger et al.
(Continued)

FOREIGN PATENT DOCUMENTS

CN 103732766 A 4/2014
CN 104884646 A 9/2015
(Continued)

OTHER PUBLICATIONS

Jun. 10, 2025, Office Action issued by the Korean Intellectual Property Office in the corresponding Korean Patent Application No. 10-2023-7011473 with English language concise statement of relevance.

(Continued)

*Primary Examiner* — Anthony M Liang
(74) *Attorney, Agent, or Firm* — KENJA IP LAW PC

(57) ABSTRACT

A material characteristic value prediction system that can predict material characteristic values with high accuracy is provided. Also provided is a method of manufacturing a metal sheet that can improve the product yield rate, by changing manufacturing conditions of subsequent processes. The material characteristic value prediction system (100) includes a material characteristic value predictor configured to acquire input data including line output factors in a metal sheet manufacturing line, disturbance factors, and component values of a metal sheet being manufactured, and predict material characteristic values of the manufactured metal sheet using a prediction model configured to take the input data as inputs, wherein the prediction model includes
(Continued)

a machine learning model generated by machine learning and configured to take the input data as inputs and output production condition factors, and a metallurgical model configured to take the production condition factors as inputs and output the material characteristic values.

21 Claims, 6 Drawing Sheets

(51) Int. Cl.

| | | |
|---|---|---|
| *C21D 8/02* | (2026.01) | |
| *C21D 8/0247* | (2026.01) | |
| *C21D 8/0278* | (2026.01) | |
| *C21D 9/46* | (2006.01) | |
| *G05B 13/02* | (2006.01) | |
| *G05B 13/04* | (2006.01) | |

(52) U.S. Cl.
CPC ............. *C21D 8/0278* (2013.01); *C21D 9/46* (2013.01); *G05B 13/0265* (2013.01); *G05B 13/048* (2013.01)

(58) Field of Classification Search
CPC .............. G05B 13/0265; G05B 13/048; G05B 19/1875; G05B 19/32193; G05B 19/32194; G05B 19/45234; G05B 23/024; G06N 20/00
See application file for complete search history.

(56) References Cited

U.S. PATENT DOCUMENTS

| | | |
|---|---|---|
| 2016/0194731 A1 | 7/2016 | Han et al. |
| 2020/0024712 A1 | 1/2020 | Iwamura |
| 2020/0257933 A1 | 8/2020 | Steingrimsson et al. |
| 2022/0072593 A1 | 3/2022 | Fujita et al. |
| 2022/0083700 A1 | 3/2022 | Takagi et al. |

FOREIGN PATENT DOCUMENTS

| | | | |
|---|---|---|---|
| JP | 2005074448 A | 3/2005 | |
| JP | 2010172962 A | 8/2010 | |
| JP | 2013084057 A | 5/2013 | |
| JP | 2018010521 A | 1/2018 | |
| JP | 2019074969 A | 5/2019 | |
| JP | 2019087152 A | 6/2019 | |
| JP | 2020115258 A | 7/2020 | |
| WO | 2020148917 A1 | 7/2020 | |

OTHER PUBLICATIONS

Aug. 16, 2022, Notification of Reasons for Refusal issued by the Japan Patent Office in the corresponding Japanese Patent Application No. 2020-154166 with English language Concise Statement of Relevance.

Sep. 14, 2021, International Search Report issued in the International Patent Application No. PCT/JP2021/029901.

Dec. 21, 2023, the Extended European Search Report issued by the European Patent Office in the corresponding European Patent Application No. 21866460.5.

May 8, 2026, Office Action issued by the China National Intellectual Property Administration in the corresponding Chinese Patent Application No. 202180061689.7 with English language search report.

Metallurgical model

Model based on Hall-Petch law

Model based on Zener-Hollomon law

[Tensile strength]

Metallurgical phenomenon factor
– Crystal grain size

Production condition factor
– Rough rolling ratio
– Finish rolling ratio
– Rolling entry temperature
– Rolling finish temperature
– Cooling start time
– Cooling rate
– Line speed
– Coiling temperature Machine learning model Component value
C, Si, Mn, P, S, Al, N, O, Ca, Ni, B, Ti, Nb, Mo, Cr, Sn, W, Ta, etc.

Line output factor
– Heating furnace heater output
– Heating furnace continuous output time
– Transfer roll rotational speed
– Bar heater output value
– Rolling load
– Difference in rolling load between upper and lower rolls, etc.

Disturbance factor
– Cooling water temperature
– Air temperature

MATERIAL CHARACTERISTIC VALUE PREDICTION SYSTEM AND METHOD OF MANUFACTURING METAL SHEET

TECHNICAL FIELD

The present disclosure relates to a material characteristic value prediction system and a method of manufacturing a metal sheet. In particular, the present disclosure relates to a material characteristic value prediction system and a method of manufacturing a metal sheet that allow, when parameters related to manufacturing fall outside a set range in the course of a manufacturing process of the metal sheet, manufacturing conditions of the subsequent processes to be optimized, so that desired material characteristic values can be ultimately obtained.

BACKGROUND

In the course of manufacturing steel sheets, molten metal is cast into slabs (cast steel) in a continuous casting process after composition adjustment. The slabs are heated and converted into hot-rolled steel sheets in a hot-rolling process. The hot-rolled steel sheets can be converted into cold-rolled steel sheets through a cold-rolling process and a continuous annealing process. The hot-rolled steel sheets can also be converted into hot-dip galvanized steel sheets through a cold-rolling process and a continuous annealing and hot-dip galvanizing process.

To manufacture metal sheets, such as steel sheets, optimal manufacturing conditions are set in each process, so as to obtain desired material characteristic values. It is, however, difficult to achieve all the manufacturing conditions as scheduled in long manufacturing processes from steelmaking to annealing. As a result, reducing variations in material properties is difficult.

To reduce such variations in material properties, Patent Literature (PTL) 1 describes a technique to construct a quality prediction model from manufacturing track records using statistical probability models, such as linear regression models, and determine quality control limits for steel to be manufactured using the quality prediction model.

Patent Literature (PTL) 2 describes a system for predicting material properties from manufacturing track record data. PTL 2 proposes a technique to control material properties with high accuracy, by using a preliminary prediction model as training data (teaching data) and determining the difference from the prediction model derived each time, to thereby predict values deviated from target values.

Patent Literature (PTL) 3 discloses a system for predicting the quality of a target product based on manufacturing track records, wherein the quality of the target product is predicted from the similarity between a prediction model for training and a quality prediction model derived from actual operation conditions of the target product. PTL 3 describes a technique for high-level prediction of the occurrence probability of defects in which, instead of conventional linear prediction, a machine learning algorithm is applied to construct the prediction model.

CITATION LIST

Patent Literatures

PTL 1: JP 2013-084057 A
PTL 2: JP 2018-010521 A
PTL 3: JP 2019-074969 A

SUMMARY

Technical Problems

The present inventors have conducted various studies and found that the conventional techniques have the following problems. First, the techniques described in PTL1 to PTL 3 consider only directly adjustable manufacturing conditions and do not consider disturbances, such as air temperature or water temperature. Such disturbances, however, significantly affect material characteristic values of final products.

Second, for example, in a case in which new materials are used in a manufacturing line and it is determined that desired material characteristic values cannot be obtained in the course of a manufacturing process, there is a demand to change conditions of the subsequent processes, so as to bring the material characteristic values closer to the desired values. Using statistical probability models, however, the technique described in PTL 1 sets highly precise target manufacturing condition values before manufacturing starts so that product quality can meet the target values. The technique does not allow conditions of the subsequent processes to be changed in the course of manufacturing. Furthermore, the techniques of PTL 2 and PTL 3 do not assume changes in conditions of such subsequent processes in the course of manufacturing. Besides, the techniques of PTL 2 and PTL 3 require a large number of training data to generate accurate prediction models. This makes it difficult to apply them when there is little or no past manufacturing track records. From the above, a system for predicting material characteristic values with high accuracy using prediction models that differ from these conventional techniques is needed. In addition, materials of the same standard may be manufactured on different days, and material characteristic values may vary due to air temperature and other disturbance factors.

It would be helpful to provide a material characteristic value prediction system that can predict material characteristic values with high accuracy. It would also be helpful to provide a method of manufacturing a metal sheet that can improve the product yield rate, by changing manufacturing conditions of subsequent processes as appropriate, based on material characteristic values predicted by the material characteristic value prediction system.

Solution to Problems

A material characteristic value prediction system according to an embodiment of the present disclosure, including
   a material characteristic value predictor configured to acquire input data including line output factors in a metal sheet manufacturing line, disturbance factors, and component values of a metal sheet being manufactured, and predict material characteristic values of the manufactured metal sheet using a prediction model configured to take the input data as inputs, wherein
   the prediction model includes:
   a machine learning model generated by machine learning and configured to take the input data as inputs and output production condition factors; and
   a metallurgical model configured to take the production condition factors as inputs and output the material characteristic values.
   A method of manufacturing a metal sheet according to an embodiment of the present disclosure that includes a hot-rolling process, a cold-rolling process, and an annealing process, the method including the process of predicting material characteristic values of the metal sheet, by acquiring the input data for the hot-rolling process using the aforementioned material characteristic value prediction system, wherein the production condition factors include rough rolling ratio, finish rolling ratio, rolling entry temperature, rolling finish temperature, temperature between rolling passes, cooling start time, cooling temperature, cooling rate, line speed, and/or coiling temperature.

A method of manufacturing a metal sheet according to an embodiment of the present disclosure that includes a hot-rolling process, a cold-rolling process, and an annealing process, the method including the process of predicting material characteristic values of the metal sheet, by acquiring the input data for the cold-rolling process using the aforementioned material characteristic value prediction system, wherein the production condition factors include rolling ratio, cold-rolling ratio, and/or frictional coefficient.

A method of manufacturing a metal sheet that includes a hot-rolling process, a cold-rolling process, and an annealing process, the method including the process of predicting material characteristic values of the metal sheet, by acquiring the input data for the annealing process using the aforementioned material characteristic value prediction system, wherein the production condition factors include line speed, annealing temperature, annealing time, heating rate, cooling temperature, cooling time, cooling rate, reheating temperature, reheating rate, and/or reheating time.

A method of manufacturing a metal sheet that includes an annealing process, a coating process, and a reheating process, the method including the process of predicting material characteristic values of the metal sheet, by acquiring the input data for the annealing process, the coating process, and the reheating process using the aforementioned material characteristic value prediction system, wherein the production condition factors include line speed, annealing temperature, annealing time, heating rate, cooling temperature, cooling time, cooling rate, reheating temperature, reheating rate, reheating time, alloying temperature, alloying time, and/or dew point.

Advantageous Effects

According to the present disclosure, a material characteristic value prediction system that can predict material characteristic values with high accuracy can be provided. According to the present disclosure, there can also be provided a method of manufacturing a metal sheet that can improve the product yield rate, by changing manufacturing conditions of subsequent processes as appropriate, based on material characteristic values predicted by the material characteristic value prediction system.

BRIEF DESCRIPTION OF THE DRAWINGS

In the accompanying drawings:

FIG. 2 illustrates another configuration example of the material characteristic value prediction system;

FIG. 5 illustrates the flow of predicting tensile strength of a hot-rolled steel sheet using the prediction model.

DETAILED DESCRIPTION (Configuration of Material Characteristic Value Prediction System)

Figure 1:
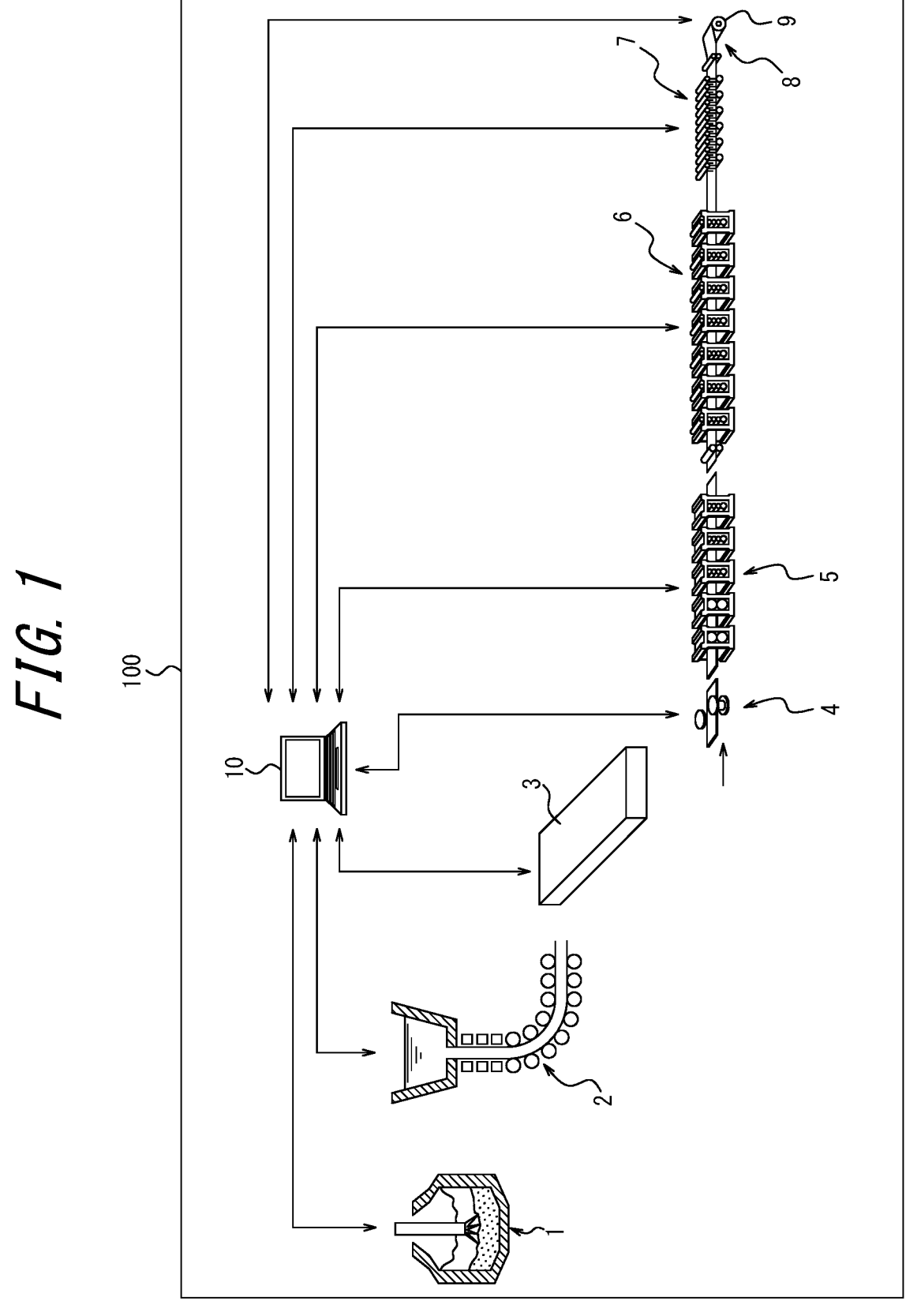
FIG. 1 illustrates a configuration example of a material characteristic value prediction system.

FIG. 1 illustrates an example configuration of a material characteristic value prediction system 100 for, for example, steel, according to an embodiment of the present disclosure. The material characteristic value prediction system 100 is configured with an information processing device 10 that is used to manufacture metal sheets. The information processing device 10 may be a process computer that manages operations. Although in the example of FIG. 1 the product is a steel strip 9, which is a steel sheet wound in a coil, the product is not limited to the steel strip 9. For example, the product may be a flat sheet of metal that is a steel material. That is, the material characteristic value prediction system 100 can be used in methods of manufacturing metal sheets in a broad sense. The steel material may be carbon steel or alloy steel. The metal sheet is not limited to steel, and it may be made of aluminum alloy, copper, titanium, magnesium, or the like, for example.

As illustrated in FIG. 1, the material characteristic value prediction system 100 includes a converter 1, a continuous casting machine 2, a heating furnace 3, a scale breaker 4, a rougher 5, a finisher 6, a cooling device 7, a coiler 8, the steel strip 9, and the information processing device 10.

In manufacturing processes, raw material iron ore is first charged into a blast furnace, together with limestone and coke, to produce pig iron in a molten state. The pig iron tapped from the blast furnace is charged into a converter 1, where the components, such as carbon, are adjusted. Secondary refining is then performed for final composition adjustment. In the continuous casting machine 2, refined steel is cast into an intermediate material called cast steel (slab). Subsequently, the slab is heated during a heating process performed in the heating furnace 3, and subjected to a hot-rolling process using the rougher 5 and the finisher 6, a cooling process using the cooling device 7, and the coiler 8. The steel strip 9 is thus manufactured. The manufacturing processes may include treatment processes, such as a pickling process, a cold-rolling process, an annealing process, a skin pass process, or an inspection process, after the cooling process, as appropriate.

Figure 2:
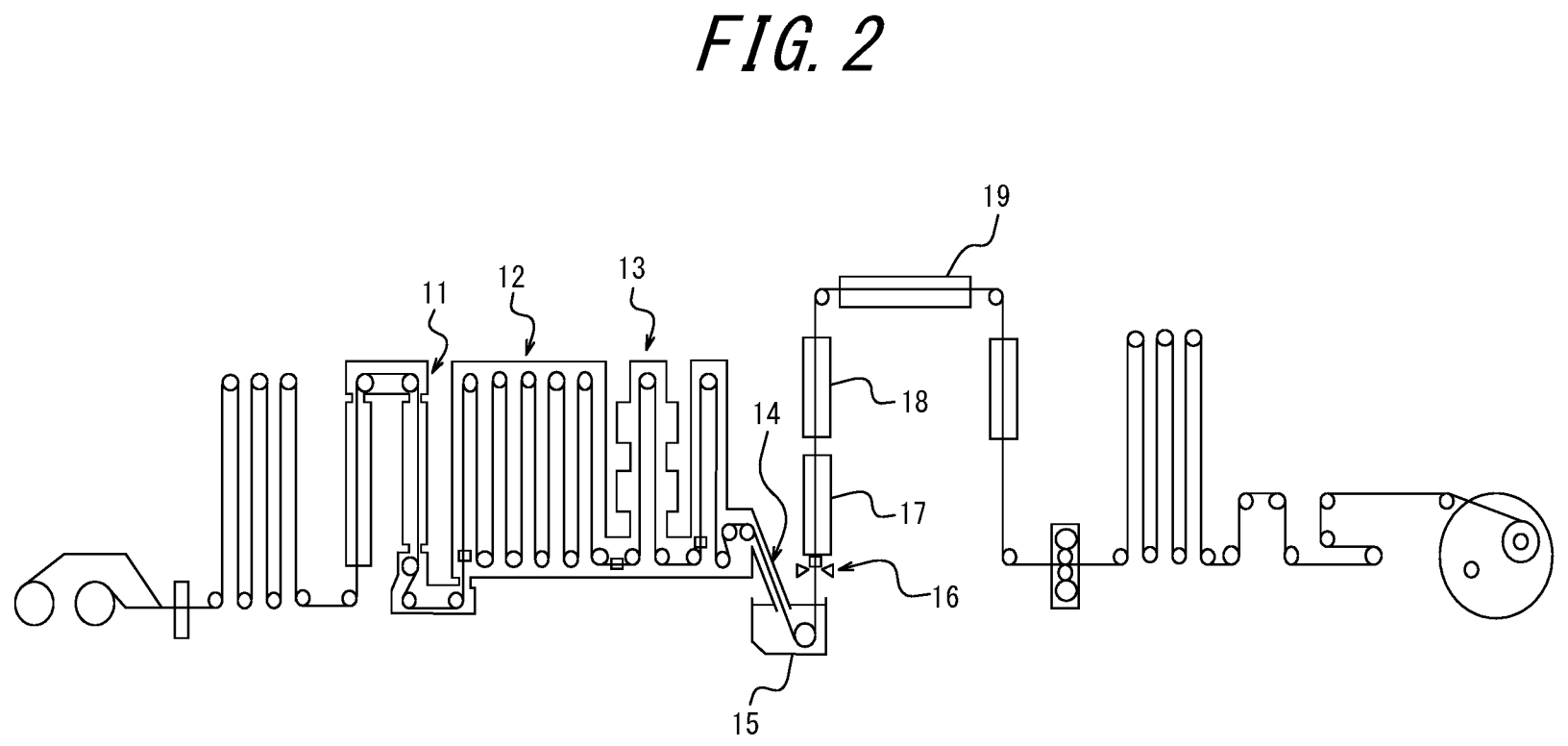

Here, the material characteristic value prediction system 100 may be configured with a metal sheet manufacturing line that is different from the one illustrated in FIG. 1. As illustrated in FIG. 2, for example, the material characteristic value prediction system 100 may include a continuous annealing line (hereafter referred to as a galvanizing line) for manufacturing hot-dip galvanized steel sheets. The galvanizing line of FIG. 2 transforms cold-rolled steel sheets to hot-dip galvanized steel sheets.

The galvanizing line includes an annealing area that has a heating zone 11, a soaking zone 12, and a cooling zone 13. The annealing process in the galvanizing line is a heat treatment process, performed in the annealing area, of heating a steel sheet from approximately room temperature and holding it at a predetermined temperature, and then cooling it to a temperature suitable for galvanizing.

The galvanizing line also includes a coating area on the downstream side of the annealing area. The coating area of the galvanizing line has a snout 14, a galvanizing tank 15, and a wiping device 16. The coating process in the galvanizing line is a process, performed in the coating area, of covering the steel sheet with an appropriate amount of coating.

The galvanizing line also includes a reheating area on the downstream side of the coating area. The reheating area of the galvanizing line has an alloying zone 17, a holding zone 18, and a final cooling zone 19. The reheating process in the galvanizing line is a heat treatment process performed in the reheating area.

The heating zone 11 has equipment for heating the steel sheet to a predetermined temperature in the range of approximately 650° C. to 950° C., depending on the type of steel. The soaking zone 12 has equipment that maintains the steel sheet at a predetermined temperature. The cooling zone 13 has equipment that cools the steel sheet to approximately 450° C., that is, a temperature suitable for galvanizing.

A mixed gas containing hydrogen, nitrogen, and water vapor is supplied into the snout 14, so as to adjust atmospheric gases until the steel sheet is immersed in the galvanizing tank 15. The galvanizing tank 15 has a sink roll inside. After passing through the snout 14, the steel sheet is immersed down into the galvanizing tank 15, and the steel sheet coated with molten zinc on the surfaces is raised above the molten bath. The wiping device 16 provides a blast of wiping gas from the nozzles arranged on both sides of the steel sheet, so as to wipe off excess molten zinc from the steel sheet surfaces, thereby regulating the coating weight (coating amount) of molten zinc.

In the alloying zone 17, the steel sheet that has passed through the wiping device 16 is heated to a temperature (typically, approximately 500° C.) at which Zn—Fe alloying reaction proceeds. The holding zone 18 maintains the temperature of the steel sheet, so as to allow time for the alloying reaction to proceed. The final cooling zone 19 cools the steel sheet that has undergone alloying treatment to approximately room temperature at the end.

Thus, the material characteristic value prediction system 100 can be configured, for example, with a metal sheet manufacturing line that accommodates a hot-rolling process, a cold-rolling process, and an annealing process. The material characteristic value prediction system 100 can also be configured, for example, with a metal sheet manufacturing line that accommodates an annealing process, a coating process, and a reheating process.

(Configuration of Information Processing Device)

Figure 3:
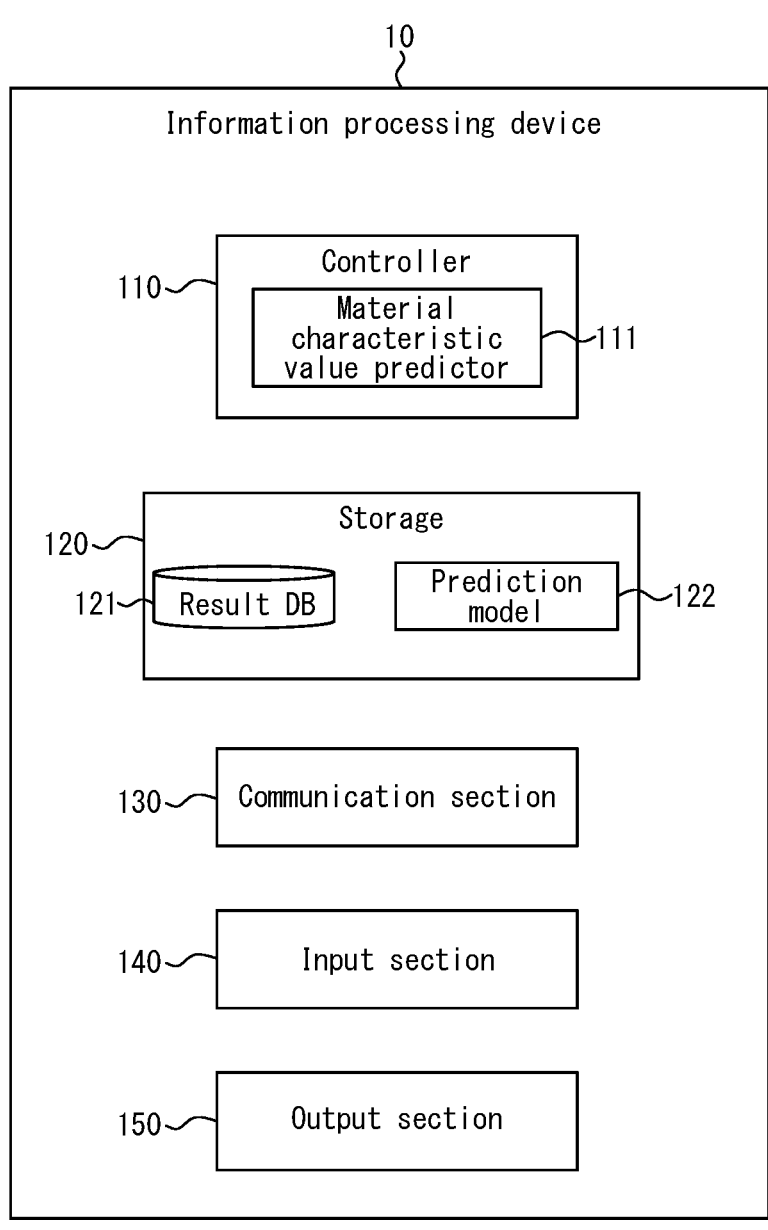
FIG. 3 is a block diagram illustrating an information processing device.

FIG. 3 is a block diagram illustrating the information processing device 10. The information processing device 10 includes a controller 110, a storage 120, a communication section 130, an input section 140, and an output section 150. The information processing device 10 calculates necessary manufacturing conditions, based on desired material characteristic values of a product, and sets production condition factors for each manufacturing apparatus. The material characteristic values are values that indicate physical characteristics, such as strength or resistance to external force or the like, of the product. Examples of the material characteristic values include tensile strength. The production condition factors are parameters (manufacturing parameters) that can be adjusted during manufacturing processes of the product. Examples of the production condition factors include rolling ratio.

In the present embodiment, the information processing device generates a prediction model 122 that includes a machine learning model generated by machine learning and a metallurgical model. The information processing device 10 functions as a material characteristic value prediction apparatus that predicts material characteristic values using the prediction model 122. The information processing device 10 can also correct production condition factors of subsequent processes, based on the predicted material characteristic values. Details of the prediction model 122 and the flow of predicting material characteristic values will be described later.

The controller 110 includes at least one processor, at least one dedicated circuit, or a combination of these. At least one processor is a general purpose processor, such as a central processing unit (CPU), or a dedicated processor that is dedicated to specific processing. At least one dedicated circuit is, for example, a field-programmable gate array (FPGA) or an application specific integrated circuit (ASIC). The controller 110 executes processes related to operations of the information processing device 10, while controlling the components of the information processing device 10.

In the present embodiment, the controller 110 includes a material characteristic value predictor 111. The material characteristic value predictor 111 acquires input data including line output factors in a metal sheet manufacturing line, disturbance factors, and component values of a metal sheet being manufactured, and predicts material characteristic values of the manufactured metal sheet using a prediction model 122 that takes the input data as inputs.

The storage 120 includes at least one semiconductor memory, at least one magnetic memory, at least one optical memory, or a combination of at least two of these. At least one semiconductor memory is, for example, random access memory (RAM) or read-only memory (ROM). The RAM is, for example, static random access memory (SRAM) or dynamic random access memory (DRAM). The ROM is, for example, electrically erasable programmable read-only memory (EEPROM). The storage 120 may function, for example, as a main memory, an auxiliary memory, or a cache memory. The storage 120 stores data to be used for operations of the information processing device 10 and data obtained by the operations of the information processing device 10. For example, the storage 120 stores a result database 121 and prediction models 122. The result database 121 stores various measurements and settings related to the manufacturing line and operations using it. The measurements and settings stored in the result database 121 include those used by the information processing device 10 as training data to generate a prediction model 122.

The communication section 130 includes at least one communication interface. At least one communication interface is, for example, a LAN interface, a WAN interface, a long term evolution (LTE), an interface that is compliant with a mobile communication standard, including the 4th generation (4G) standard and the 5th generation (5G) standard, or an interface that is compliant with short-range wireless communications, including Bluetooth® (Bluetooth is a registered trademark in Japan, other countries, or both). The communication section 130 receives data used for operations of the information processing device 10. The communication section 130 also transmits data obtained based on the operations of the information processing device 10.

The input section 140 includes at least one input interface. At least one input interface may include, for example, physical keys, capacitive keys, a pointing device, a touch screen integrally provided with a display, a microphone, or the like. The input section 140 receives the operation of inputting data used for operations of the information processing device 10. The input section 140 may be connected to the information processing device 10 as an external input device, instead of being included in the information processing device 10. Any method, such as universal serial bus (USB), high-definition multimedia interface (HDMI®) (HDMI is a registered trademark in Japan, other countries, or both), or Bluetooth®, may be used as a method of connection.

The output section 150 includes at least one output interface. At least output interface is, for example, a display or a speaker. The displays is, for example, a liquid crystal display (LCD) or an organic electro luminescent (EL) display. The output section 150 outputs data obtained based on operations of the information processing device 10. The output section 150 may be connected to the information processing device 10 as an external output device, instead of being included in the information processing device 10. Any method, such as USB, HDMI®, or Bluetooth®, may be used as a method of connection.

The functions of the information processing device 10 are realized by executing a program describing information processing performed in the present embodiment by a processor corresponding to the controller 110. That is, the functions of the information processing device 10 are realized by software. The program enables a computer to function as the information processing device 10, by causing the computer to execute operations of the information processing device 10.

Some or all of the functions of the information processing device 10 may be implemented by a dedicated circuit corresponding to the controller 110. That is, some or all of the functions of the information processing device 10 may be implemented by hardware.

(Prediction Model)

Figure 4:
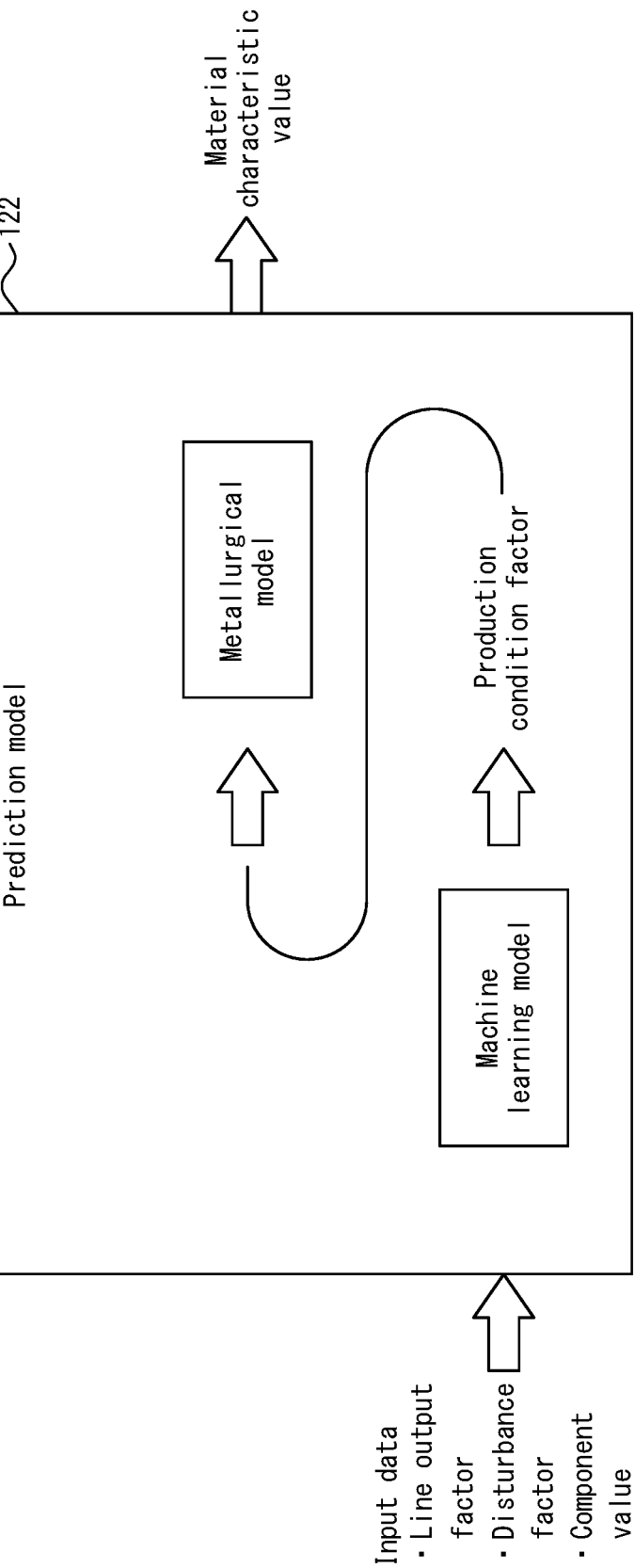
FIG. 4 illustrates the flow of predicting material characteristic values using a prediction model.

FIG. 4 illustrates the flow of predicting material characteristic values using a prediction model 122. The present inventors have conducted earnest studies on the prediction model 122 and found that prediction accuracy of material characteristic values can be improved, by using hybrid parameters on metallurgy and operational track records in which metallurgical parameters are converted into actual operational parameters.

The prediction model 122 used by the information processing device 10 to predict material characteristic values is configured with a machine learning model and a metallurgical model. In the present embodiment, the machine learning model takes input data including line output factors, disturbance factors, and component values of a metal sheet being manufactured, as inputs, and it outputs production condition factors. As mentioned earlier, the production condition factors are parameters that can be adjusted during manufacturing processes of the product. In the present embodiment, the production condition factors indicate manufacturing conditions of some of the metal sheet manufacturing processes, and the content varies depending on which processes are targeted. Examples of the production condition factors will be described below. The machine learning model is generated by machine learning, and, for example, by using training data that includes disturbance factors, it can reflect the effect of disturbance factors on production condition factors. The machine learning model can accurately identify the relationship between actual operational parameters related to operations of the manufacturing line that manufactures metal sheets, operational track record parameters, and production condition factors.

In this embodiment, the metallurgical model receives the production condition factor as input and outputs at least one material characteristic value. Examples of the material characteristic value include tensile strength, yield stress, elongation, hole expansion ratio, bendability, r value, hardness, fatigue resistance, impact value, delayed fracture value, wear value, chemical convertibility, high-temperature property, low-temperature toughness, corrosion resistance, magnetic property, and surface characteristics. The metallurgical model is a prediction formula based on the physicochemical phenomenon of metal. The metallurgical model may be made up of a plurality of models. For example, the metallurgical model may include a first metallurgical model that receives the production condition factor as input and outputs at least one metallurgical phenomenon factor, and a second metallurgical model that receives the metallurgical phenomenon factor as input and outputs the material characteristic value. Examples of the metallurgical phenomenon factor include volume fraction, surface characteristics, precipitate dimension, precipitate density, precipitate shape, precipitate dispersion state, recrystallization ratio, phase fraction, crystal grain shape, texture, residual stress, dislocation density, and crystal grain size. In the case where the metallurgical phenomenon can be actually measured, the metallurgical phenomenon factor measurement value may be used. Examples of the method of measuring the metallurgical phenomenon include an in-line X-ray measuring instrument, an ultrasonic flaw detector, and a magnetic measuring instrument.

The metallurgical model identifies metallurgical phenomena with high accuracy, based theoretical relations of physicochemical phenomena. The metallurgical model may further reflect empirical rules based on operational track records of manufacturing apparatuses. The metallurgical model can accurately identify the relationship between metallurgical parameters, production condition factors, and material characteristic values. It is noted that the metallurgical model is generated without machine learning, and its accuracy does not vary depending on the number of training data. Accordingly, even when there are a few or no past manufacturing track records, it is possible to accurately adjust production condition factors, by performing an inverse analysis using the metallurgical model. In the inverse analysis, for example, input values are randomly given to a material characteristic value prediction model using a metallurgical model constructed with production condition factors as input values, within an applicable range of the model, so as to estimate material characteristic values, and input values close to target material characteristic values are used as optimal production condition factors.

FIG. 5 illustrates the flow of predicting tensile strength of a hot-rolled steel sheet using the prediction model 122. For example, the prediction of tensile strength of FIG. 5 is performed in the course of subjecting a slab that has been manufactured in a steelmaking process to a hot-rolling process, a cold-rolling process, and an annealing process, so as to manufacture a final steel sheet.

When determining that the components of the slab is outside a set range, the information processing device 10 of the material characteristic value prediction system 100 acquires input data including line output factors in the subsequent hot-rolling process, disturbance factors, and component values of the hot-rolled steel sheet. The line output factors include, for example, heat output of the heating furnace, continuous output time of the heating furnace, transfer roll rotational speed, bar heater output value, rolling load, difference in rolling load between upper and lower rolls, interstand spray pressure, run-out table coolant volume, and/or run-out table coolant pressure in the hot-rolling process. The disturbance factors include, for example, cooling water temperature and/or air temperature in the hot-rolling process. The component values include, for example, C, Si, Mn, P, S, Al, N, O, Ca, Ni, B, Ti, Nb, Mo, Cr, Sn, W, and/or Ta value measured for the hot-rolled steel sheet. Here, for example, the cooling water temperature in the hot-rolling process, the air temperature, the expected air temperature when it passes through each process, or the like may be used as the disturbance factors. Values during the steelmaking process may be used as the component values.

The information processing device 10 inputs the input data to the machine learning model, so as to obtain production condition factors. In the example of FIG. 5, the machine learning model outputs production condition factors that can be set in the hot-rolling process. The production condition factors include, for example, rough rolling ratio, finish rolling ratio, rolling entry temperature, rolling finish temperature, cooling start time, cooling rate, line speed, and/or coiling temperature in the hot-rolling process.

The information processing device 10 inputs the production condition factors to the metallurgical model, so as to obtain a predicted value, that is, tensile strength of the steel sheet. In the example of FIG. 5, the metallurgy model includes the first metallurgy sub-model that takes the production condition factors as inputs and outputs metallurgical phenomenon factors, and the second metallurgy sub-model that takes the metallurgical phenomenon factors as inputs and outputs material characteristic values. The first metallurgical sub-model is a model that is based on, for example, the Zener-Hollomon law. The second metallurgical sub-model is a model that is based on, for example, the Hall-Petch law.

The Zener-Hollomon law is an empirical rule for estimating the recrystallization of metallic structures when the metal is processed at a high temperature. In the present disclosure, an improved model based on the Zener-Hollomon law using manufacturing track records as input values is employed to output metallurgical phenomenon factors, such as crystal grain size.

The Hall-Petch law is an empirical rule for estimating material strength from the crystal grain size of metallic structures. In the present disclosure, an improved model based on the Hall-Petch law using manufacturing track records as input values is employed to output tensile strength from crystal grain size of metallic structures.

A prediction model 122 that includes a machine learning model and a metallurgical model is generated depending on the process of the metal sheet manufacturing line. FIG. 5 illustrates an example prediction model 122 for the hot-rolling process. For example, a different prediction model 122 is prepared for each of the cold-rolling process and the annealing processes.

The prediction model 122 for the cold-rolling process after the hot-rolling process is used to predict material characteristic values, for example, when the hot-rolling process has been executed and it is determined that rolling conditions of the hot-rolled steel sheet are outside a set range. At this time, the information processing device 10 acquires input data for the cold-rolling process. Line output factors that are inputted to the machine learning model include, for example, rolling load, difference in rolling load between upper and lower rolls, roll diameter, roll rotational speed, and/or lubrication conditions in the cold-rolling process. Production condition factors that are outputted by the machine learning model include, for example, rolling ratio, cold-rolling ratio, and/or frictional coefficient in the cold-rolling process.

The prediction model 122 for the annealing process after the cold-rolling process is used to predict material characteristic values, for example, when the cold-rolling process has been executed and it is determined that rolling conditions of the cold-rolled steel sheet are outside a set range. At this time, the information processing device 10 acquires input data for the annealing process. Line output factors that are inputted to the machine learning model include, for example, annealing furnace output value, cooling gas injection volume, fractions of gas species, and/or alloying furnace output value in the annealing process. Production condition factors that are outputted by the machine learning model include, for example, line speed, annealing temperature, annealing time, heating rate, cooling temperature, cooling time, cooling rate, reheating temperature, reheating rate, and/or reheating time in the annealing process.

Tensile strength can also be predicted, for example, in the course of subjecting a slab that has been manufactured in a steelmaking process to a hot-rolling process, a cold-rolling process, an annealing process, a coating process, and a reheating process, so as to manufacture a final coated steel sheet.

A prediction model 122 is used to predict material characteristic values of the coated steel sheet, for example, when the components of the slab are determined to be outside a set range. At this time, the information processing device 10 acquires input data for processes after the steelmaking process, that is, the annealing process, the coating process, and the reheating process. Line output factors that are inputted to the machine learning model include, for example, annealing furnace output value, cooling gas injection volume, fractions of gas species, and/or alloying furnace output value. Production condition factors that are outputted by the machine learning model include, for example, line speed, annealing temperature, annealing time, heating rate, cooling temperature, cooling time, cooling rate, reheating temperature, reheating rate, reheating time, alloying temperature, alloying time, and/or dew point. In this example, the input data includes line output factors of a plurality of processes after the steelmaking process, that is, those of the annealing process, those of the coating process, and those of the reheating process. Similarly, outputs from the machine learning model include production condition factors of a plurality of processes after the steelmaking process, that is, those of the annealing process, those of the coating process, and those of the reheating process. The machine learning model outputs production condition factors of a subsequent process from input data related to the subsequent process. The subsequent process may be one process, or it may include a plurality of processes as in this example.

(Generation of Machine Learning Model)

Before performing prediction as described above, the information processing device 10 acquires training data from the result database 121 and generates a machine learning model using the training data. The training data is selected according to the process of the method of manufacturing a metal sheet in which the machine learning model is to be used. For example, training data selected for generating a machine learning model for a hot-rolling process may include, as inputs, heat output of the heating furnace, continuous output time of the heating furnace, transfer roll rotational speed, bar heater output value, rolling load, difference in rolling load between upper and lower rolls, interstand spray pressure, run-out table coolant volume, and run-out table coolant pressure, and it may also include, as outputs, rough rolling ratio, finish rolling ratio, rolling entry temperature, rolling finish temperature, temperature between rolling passes, cooling start time, cooling temperature, cooling rate, line speed, and coiling temperature. For example, training data selected for generating a machine learning model for a cold-rolling process may include, as inputs, rolling load, difference in rolling load between upper and lower rolls, roll diameter, roll rotational speed, and lubrication conditions, and it may also include, as outputs, rolling ratio, cold-rolling ratio, and/or frictional coefficient. For example, training data selected for generating a machine learning model for a cold-rolled steel sheet manufacturing process may include, as inputs, annealing furnace output value and cooling gas injection volume, and it may also include, as outputs, line speed, annealing temperature, annealing time, heating rate, cooling temperature, cooling time, cooling rate, reheating temperature, reheating rate, and reheating time. For example, training data selected for generating a machine learning model for a coated steel sheet manufacturing process may include, as inputs, annealing furnace output value, cooling gas injection volume, fractions of gas species, and alloying furnace output value, and it may also include, as outputs, line speed, annealing temperature, annealing time, heating rate, cooling temperature, cooling time, cooling rate, reheating temperature, reheating rate, reheating time, alloying temperature, alloying time, and dew point.

Here, all training data include one or more disturbance factors as inputs. Accordingly, any machine learning model considers disturbances that affect material characteristic values of products. Further, all training data inputs contain at least one component value. Methods for generating machine learning models using such training data may include, but are not limited to, neural networks, for example. In another example, machine learning models may be generated by methods, such as decision trees or random forests. (Method of Manufacturing Metal Sheet)

Figure 6:
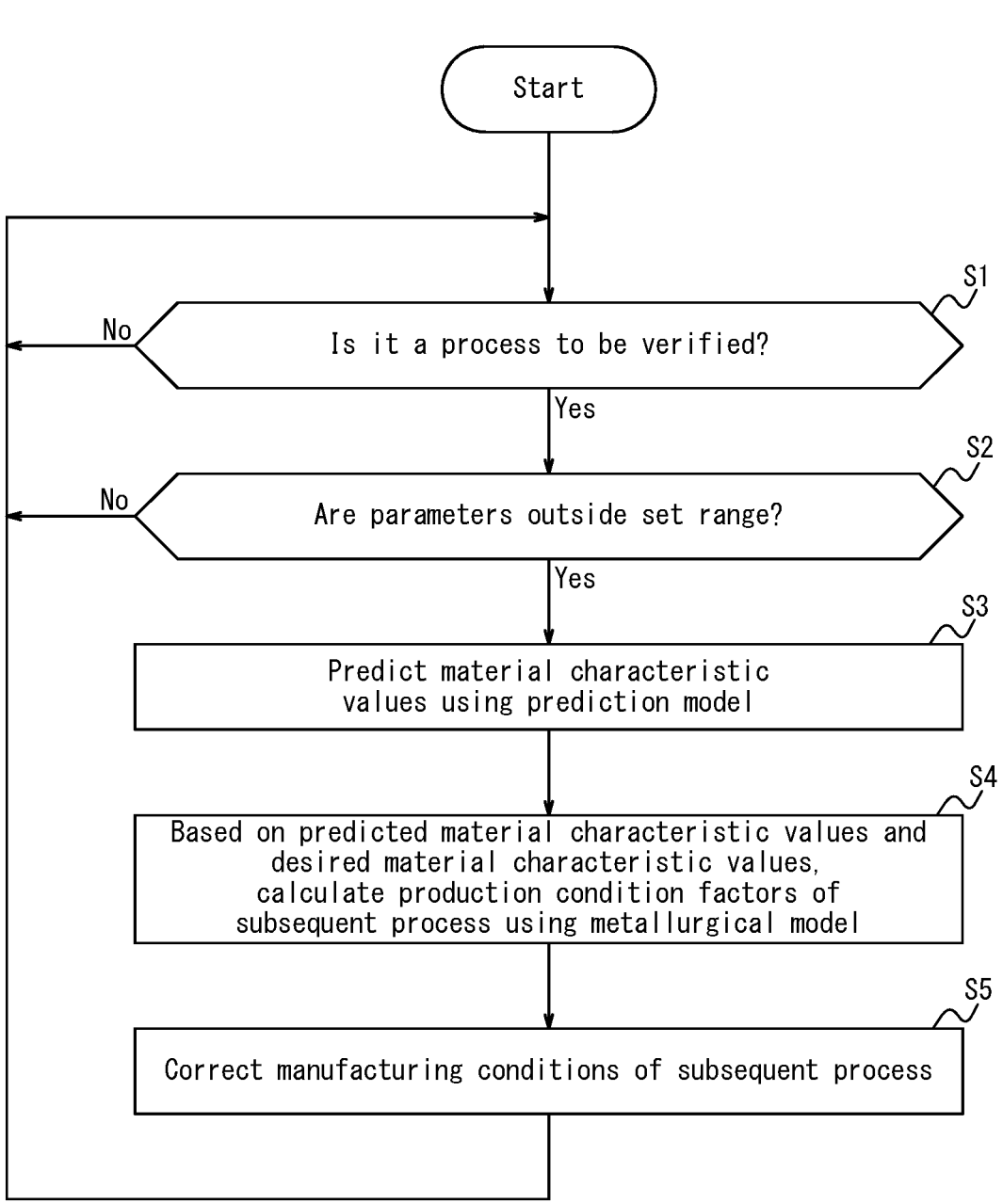
FIG. 6 is a flowchart illustrating processing related to prediction of material characteristic values that is performed during manufacturing of a metal sheet.

A method of manufacturing a metal sheet can be performed using the material characteristic value prediction system 100 described above. The method includes the process of predicting material characteristic values of the metal sheet. FIG. 6 is a flowchart illustrating processing related to the prediction of material characteristic values that is performed during the manufacturing of the metal sheet.

The material characteristic value prediction system 100 waits when a metal sheet manufacturing process being executed is not a process to be verified (No in Step S1), and it proceeds to Step S2 when it is the process to be verified (Yes in Step S1). Here, the process to be verified includes some processes selected from metal sheet manufacturing processes, and this is a process on which determination of Step S2 is to be made. For example, in a case in which the metal sheet manufacturing processes include a steelmaking process, a hot-rolling process, the first pickling process, a cold-rolling process, an annealing process, the second pickling process, a skin pass process, an inspection process, and a shipping process, the processes to be verified may include the steelmaking process, the hot-rolling process, the cold-rolling process, and the annealing process. The process to be verified may include a plurality of processes in this way, or it may be one process. The process to be verified may be selected on the condition that it has a plurality of production condition factors, that is, the manufacturing conditions can be adjusted with a plurality of parameters.

When parameters related to the process to be verified are not outside a set range (No in Step S2), the material characteristic value prediction system 100 returns to processing of Step S1. When the parameters are outside the set range, the material characteristic value prediction system 100 proceeds to processing of Step S3 (Yes in Step S2). Here, the parameters related to the process to be verified are measurements on products being manufactured or measurements on the manufacturing line from which material characteristic values of a final product can be predicted to be outside the target range (of desired material characteristic values). For example, in a case in which the steelmaking process is being performed as a process to be verified, a parameter may be the measurement of the C component of the slab. When the measurement of the C component of the slab deviates from a normal reference value well beyond tolerance, the material characteristic value prediction system 100 can proceed to the processing of Step S3.

The material characteristic value prediction system 100 predicts material characteristic values using a prediction model 122 as described above (Step S3). Here, the material characteristic value prediction system 100 predicts the material characteristic values only when it determines that there is a defect in a product being manufactured. In other words, when it is determined that there is no problem with manufacturing conditions, the predictive calculation of material characteristic values is not performed, and a later-described correction is not made to manufacturing conditions. The manufacturing of the metal sheet can therefore proceed efficiently.

Based on the predicted material characteristic values and desired material characteristic values, the material characteristic value prediction system 100 calculates production condition factors of the subsequent process using a metallurgical model (Step S4). The material characteristic value prediction system 100 performs an inverse analysis using the metallurgical model, so as to calculate, for example, values to which production condition factors are to be corrected, in order to reduce the difference between the predicted material characteristic values and the desired material characteristic values. For example, when the steelmaking process has been executed and the components of the slab are outside the set range, the material characteristic value prediction system 100 may use a prediction model 122 for the subsequent process, that is, the hot-rolling process, so as to predict material characteristic values of the final product. In order to bring the predicted material characteristic values closer to the target values set at the beginning of manufacturing, the material characteristic value prediction system 100 may then calculate values to which production condition factors of the hot-rolling process are to be corrected, by inverse analysis of the metallurgical model.

The material characteristic value prediction system 100 corrects manufacturing conditions of the subsequent process, based on the values calculated in Step S4 (Step S5). The material characteristic value prediction system 100 then returns to the processing of Step S1 and performs the same processing for the next process to be verified. For example, a series of processing may be performed when the manufacturing conditions of the hot-rolling process have been corrected as described above and the hot-rolling process as a process to be verified is executed. In a case in which the components of the hot-rolled steel sheet are outside the set range even under the corrected manufacturing conditions, the material characteristic value prediction system 100 can predict material characteristic values of the final product using a prediction model 122 for the subsequent process, that is, the cold-rolling process. In order to bring the predicted material characteristic values closer to the target values set at the beginning of manufacturing, the material characteristic value prediction system 100 may calculate values to which production condition factors of the cold-rolling process are to be corrected, by inverse analysis of the metallurgical model. The material characteristic value prediction system 100 may change manufacturing conditions of the cold-rolling process, based on the correction values.

As has been described, with the above configuration, the material characteristic value prediction system 100 according to the present embodiment can predict material characteristic values of a final product with high accuracy using a prediction model 122 that considers disturbances that significantly affect the material characteristic values. Further, the method of manufacturing a metal sheet according to the present embodiment can improve the product yield rate, by changing manufacturing conditions of subsequent processes as appropriate, based on material characteristic values predicted by the material characteristic value prediction system 100.

Although the present disclosure has been described based on the drawings and examples, it is to be noted that various modifications and changes may be made by those skilled in the art based on the present disclosure. Accordingly, such modifications and changes are included within the scope of the present disclosure. For example, functions or the like included in each means, each step, or the like can be rearranged without logical inconsistency, and a plurality of means, steps, or the like can be combined into one or divided.

Here, metal sheets manufactured using the material characteristic value prediction system 100 are not limited to those used in specific fields. That is, metal sheets manufactured using the material characteristic value prediction system 100 are widely used in automobiles, construction machinery, transportation such as cars or trains, medical care, food, home appliances, or the like.

Although in the above embodiment unpredictable changes in air temperature, water temperature such as cooling water temperature, or the like are described as examples of disturbances, they are not limited to these.

REFERENCE SIGNS LIST

1 Converter
2 Continuous casting machine
3 Heating furnace
4 Scale breaker
5 Rougher
6 Finisher
7 Cooling device
8 Coiler
9 Steel strip
10 Information processing device
11 Heating zone
12 Soaking zone
13 Cooling zone
14 Snout
15 Galvanizing tank
16 Wiping device
17 Alloying zone
18 Holding zone
19 Final cooling zone
100 Material characteristic value prediction system
110 Controller
111 Material characteristic value predictor

120 Storage
121 Result database
122 Prediction model
130 Communication section
140 Input section
150 Output section

The invention claimed is:

1. A material characteristic value prediction system comprising a material characteristic value predictor configured to acquire input data including line output factors in a metal sheet manufacturing line, disturbance factors which are at least one of cooling water temperature and air temperature in the hot-rolling process, and component values of a metal sheet being manufactured, and predict material characteristic values of the manufactured metal sheet using a prediction model configured to take the input data as inputs, wherein the prediction model includes:

a machine learning model generated by machine learning and configured to take the input data as inputs and output production condition factors; and a metallurgical model configured to take the production condition factors as inputs and output the material characteristic values.

2. The material characteristic value prediction system according to claim 1, wherein the metallurgical model is a prediction formula based on a physicochemical phenomenon of metal.

3. The material characteristic value prediction system according to claim 1, wherein the metallurgical model includes: a first metallurgical model that receives the production condition factor as input and outputs a metallurgical phenomenon factor; and a second metallurgical model that receives the metallurgical phenomenon factor as input and outputs the material characteristic value, and the metallurgical phenomenon factor includes at least one of volume fraction, surface characteristics, precipitate dimension, precipitate density, precipitate shape, precipitate dispersion state, recrystallization ratio, phase fraction, crystal grain shape, texture, residual stress, dislocation density, and crystal grain size.

4. The material characteristic value prediction system according to claim 1, wherein the material characteristic value includes at least one of tensile strength, yield stress, elongation, hole expansion ratio, bendability, r value, hardness, fatigue resistance, impact value, delayed fracture value, wear value, chemical convertibility, high-temperature property, low-temperature toughness, corrosion resistance, magnetic property, and surface characteristics.

5. The material characteristic value prediction system according to claim 1, wherein the metal sheet comprises steel.

6. A method of manufacturing a metal sheet that includes a hot-rolling process, a cold-rolling process, and an annealing process, the method comprising the process of predicting material characteristic values of the metal sheet, by acquiring the input data for the hot-rolling process using the material characteristic value prediction system according to claim 1, wherein the production condition factors include rough rolling ratio, finish rolling ratio, rolling entry temperature, rolling finish temperature, temperature between rolling passes, cooling start time, cooling temperature, cooling rate, line speed, and/or coiling temperature.

7. The method according to claim 6, wherein the line output factors include heat output of a heating furnace, continuous output time of the heating furnace, transfer roll rotational speed, bar heater output value, rolling load, difference in rolling load between upper and lower rolls, interstand spray pressure, run-out table coolant volume, and/or run-out table coolant pressure.

8. A method of manufacturing a metal sheet that includes a hot-rolling process, a cold-rolling process, and an annealing process, the method comprising the process of predicting material characteristic values of the metal sheet, by acquiring the input data for the cold-rolling process using the material characteristic value prediction system according to claim 1, wherein the production condition factors include rolling ratio, cold-rolling ratio, and/or frictional coefficient.

9. The method according to claim 8, wherein the line output factors include rolling load, difference in rolling load between upper and lower rolls, roll diameter, roll rotational speed, and/or lubrication conditions.

10. A method of manufacturing a metal sheet that includes a hot-rolling process, a cold-rolling process, and an annealing process, the method comprising the process of predicting material characteristic values of the metal sheet, by acquiring the input data for the annealing process using the material characteristic value prediction system according to claim 1, wherein the production condition factors include line speed, annealing temperature, annealing time, heating rate, cooling temperature, cooling time, cooling rate, reheating temperature, reheating rate, and/or reheating time.

11. The method according to claim 10, wherein the line output factors include annealing furnace output value, cooling gas injection volume, fractions of gas species, and/or alloying furnace output value.

12. A method of manufacturing a metal sheet that includes an annealing process, a coating process, and a reheating process, the method comprising the process of predicting material characteristic values of the metal sheet, by acquiring the input data for the annealing process, the coating process, and the reheating process using the material characteristic value prediction system according to claim 1, wherein the production condition factors include line speed, annealing temperature, annealing time, heating rate, cooling temperature, cooling time, cooling rate, reheating temperature, reheating rate, reheating time, alloying temperature, alloying time, and/or dew point.

13. The method according to claim 12, wherein the line output factors include annealing furnace output value, cooling gas injection volume, fractions of gas species, and/or alloying furnace output value.

14. The method according to claim 6, comprising a process of changing manufacturing conditions based on the predicted material characteristic values of the metal sheet and desired material characteristic values.

15. The method according to claim 7, comprising a process of changing manufacturing conditions based on the predicted material characteristic values of the metal sheet and desired material characteristic values.

16. The method according to claim 8, comprising a process of changing manufacturing conditions based on the predicted material characteristic values of the metal sheet and desired material characteristic values.

17. The method according to claim 9, comprising a process of changing manufacturing conditions based on the predicted material characteristic values of the metal sheet and desired material characteristic values.

18. The method according to claim 10, comprising a process of changing manufacturing conditions based on the predicted material characteristic values of the metal sheet and desired material characteristic values.

19. The method according to claim 11, comprising a process of changing manufacturing conditions based on the predicted material characteristic values of the metal sheet and desired material characteristic values.

20. The method according to claim 12, comprising a process of changing manufacturing conditions based on the predicted material characteristic values of the metal sheet and desired material characteristic values.

21. The method according to claim 13, comprising a process of changing manufacturing conditions based on the predicted material characteristic values of the metal sheet and desired material characteristic values.

* * * * *